Feb. 2, 1960    H. E. BURHOP    2,923,566

TURNBUCKLE

Filed Nov. 21, 1955

INVENTOR.
HOWARD E. BURHOP

BY
William R. Lane
ATTORNEY

United States Patent Office 2,923,566
Patented Feb. 2, 1960

2,923,566

TURNBUCKLE

Howard E. Burhop, Palos Verdes Estates, Calif., assignor to North American Aviation, Inc.

Application November 21, 1955, Serial No. 548,094

2 Claims. (Cl. 287—62)

This invention pertains to a turnbuckle device for use in tightening and maintaining tension on flexible cables or the like.

This invention has as its object the avoidance of certain objections characteristic of turnbuckle design in the prior art. The conventional type turnbuckle is a relatively long unit in order that the full range of necessary adjustment may be accomplished. This means that for certain installations, for example where a cable must run between closely spaced pulleys, a turnbuckle installation is impractical because the turnbuckle would strike the pulleys upon movement of the cable. The bulky conventional turnbuckle not only carries a size penalty, but also has the attendant disadvantage of considerable weight. The latter is always an important factor where aircraft control cables are concerned. Furthermore, conventional turnbuckle design does not make for easy installation and adjustment.

This invention provides considerably improved results by a simple design. This includes a hollow elongated cylinder which retains one cable end, while a slide member inside the cylinder has projections engaged by a nut which is threadably received on the exterior of the cylinder for positioning the slide member with respect to the cylinder. The slide member retains the second cable end thereby providing the adjustment of the cables.

It is accordingly an object of this invention to provide a turnbuckle of compact design providing a maximum of adjustment in a minimum of length. Another object of this invention is to provide a turnbuckle which is light in weight yet provides more than adequate strength. A further object of this invention is to provide a turnbuckle which is easily installed and adjusted. Yet another object of this invention is to provide a turnbuckle simplified in design and economical to manufacture. These and other objects will become apparent from the following detailed description taken in connection with the accompanying drawing in which:

Figure 1:
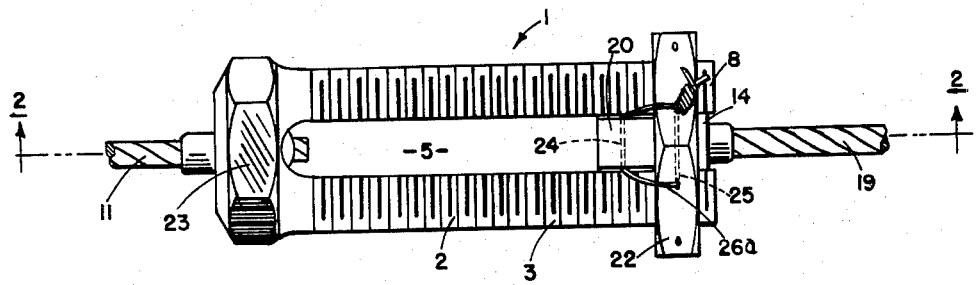
Fig. 1 is a top plan view of the turnbuckle of this invention.
Figure 2:
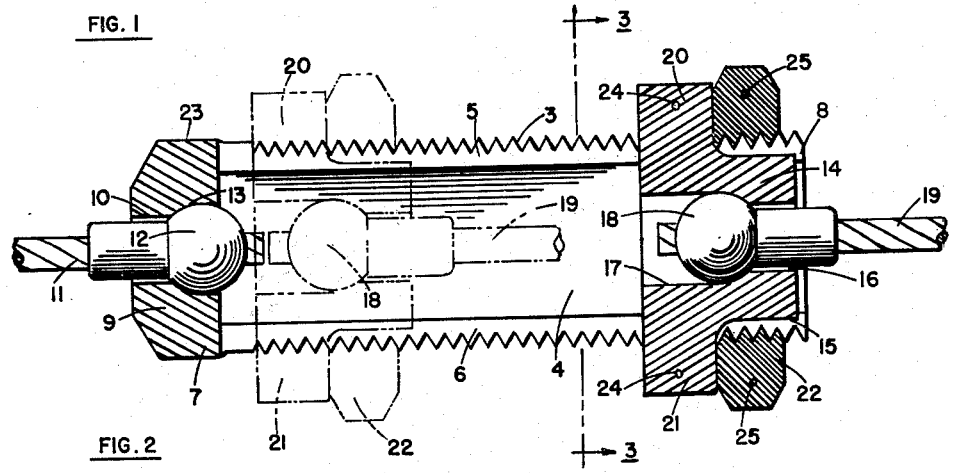
Fig. 2 is an enlarged sectional view taken along line 2—2 of Fig. 1.

Referring to the drawing, turnbuckle 1 of this invention includes a cylindrical body member 2 having a threaded exterior surface 3. The cylindrical member is hollow having a smooth cylindrical inner surface 4. Extending through the wall of cylindrical member 2 are oppositely disposed slots 5 and 6 which are of constant width and extend substantially from end 7 of the turnbuckle to the opposite end 8. The purpose of these slots will be made more clear hereinafter.

End 7 is closed by wall 9. This wall is provided with an aperture 10 on the axis of the cylinder which transmits a cable 11 having an enlarged ball end 12 swaged thereto. A socket is formed at 13 in wall 9 and receives ball end 12. Wall 9 with the socket thereby provides an abutment which interferingly engages and retains the cable end and maintains the cable 11 in engagement with the cylindrical body 2 at the axis thereof.

The opposite end 8 of member 2 remains open. A slide member 14 is introduced through this end into the body member. The slide includes a cylindrical exterior surface 15 which is substantially complementary to the interior surface 4 of member 2 while at the same time affording enough clearance to allow member 14 to slide freely within the interior of the cylindrical body whereby it is reciprocal relative thereto. Member 14, in a manner generally similar to the provisions for wall 9, includes an aperture 16 along the axis of the cylindrical body member. A centrally disposed socket portion 17 is also provided which may be interferingly engaged by enlarged ball end 18 swaged to cable 19. The slide member therefore retains the end of cable 19, and this cable will be caused by the abutment formed by socket 17 to move with the slide. Cable 19 is positioned at the axis of body 2 by the central location of the socket.

Projecting from opposite sides of slide 14 are ears 20 and 21 which extend beyond exterior surface 4 of the cylindrical body member. These projections are engageable with the sides of slots 5 and 6 to preclude rotation of slide 14, and are engaged by a nut member 22 which is threadably received on the exterior of body member 2. Thus, it is apparent that rotation of nut 22 will cause the same to be positioned axially along the exterior of body member 2, at the same time positioning a slide 14 which travels therewith. This controls the position of cable end 18 with respect to the body member, and accordingly determines the spacing between the cable ends so as to effect adjustment of the turnbuckle. In this manner the slide may be adjusted, for example, from the position illustrated in full lines near end 8 of member 2, to the position shown in phantom near the opposite end 7. A hexagonal portion 23 at end 7 facilitates the setting of the device.

It may be seen that by this design the length of adjustment of the turnbuckle is virtually the length of body member 2. This means that in obtaining a necessary amount of adjustment the turnbuckle may be extremely compact being little longer than the length of the adjustment range itself. This is accomplished with a simplified design which is both light in weight, economical to construct, and possesses a great holding power. The provision of the hexagonal portion at 23 of the body, plus the conventional nut 22, mean that the turnbuckle is quite easily adjusted. As previously pointed out, the abutments formed by the sockets in end wall 9 and slide 14 position the cables at the axis of the cylindrical body. As a result the body is subjected to no bending forces from tension on the cables and accordingly may be of lighter construction than would be possible if it were subjected to bending.

The position of slide member and nut along cylindrical body 2 is maintained against inadvertent movement by providing safety wire through the nut and slide. For this purpose apertures 24 are provided through ears 20 and 21 of the slide, and apertures 25 extend through the corners of the nut. Safety wire 26a extends through these openings (see Fig. 1) and positively locks the nut to the slide, preventing rotation of the nut and thus retaining the setting. This is a much simpler and less time consuming procedure than that required for conventional turnbuckles.

Figure 4:
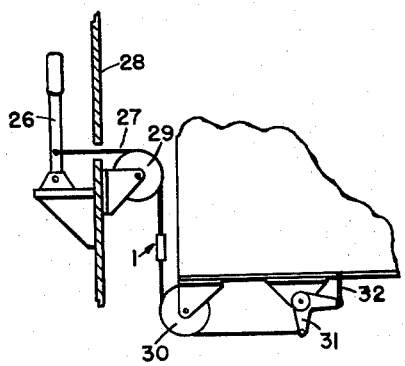
Fig. 4 is a schematic fragmentary showing of a typical installation advantageously using the turnbuckle of this invention.
Figure 3:
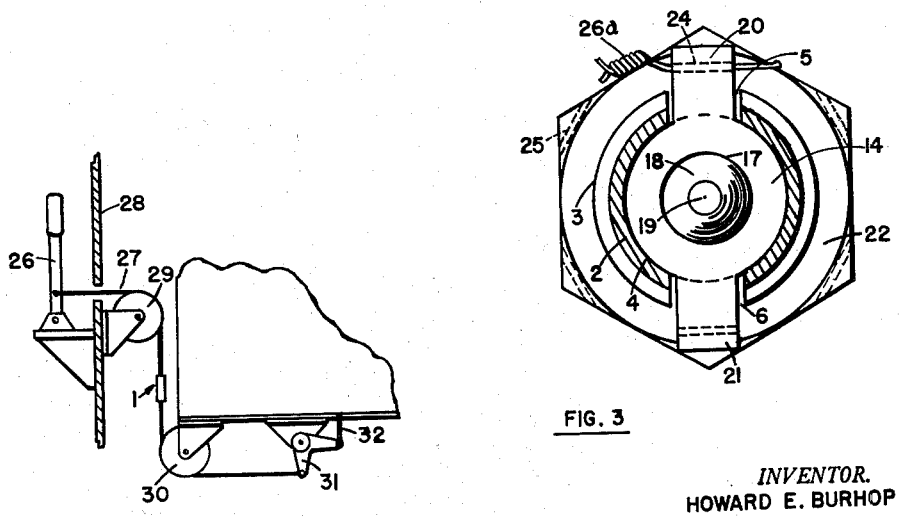
Fig. 3 is a sectional view taken along line 3—3 of Fig. 2.

Fig. 4 provides an illustration of a typical installation of the turnbuckle of this invention. Control stick 26 of an aircraft is provided with a control cable 27 extending through an aperture in bulkhead 28, and around a pair of pulleys 29 and 30 to a bellcrank 31, the latter in turn driving a rod 32. It may be noted that nowhere in the cable system shown is there any relatively long uninterrupted cable run where a conventional turnbuckle may be provided. However, the compactness of turnbuckle 1 of this invention permits its use between pulleys 29 and 30, or it might as easily be used between pulley 30 and bellcrank 31. A conventional turnbuckle would fit in none of these places without interference upon movement of the cable.

The foregoing detailed description is to be clearly understood as given by way of illustration and example, the spirit and scope of this invention being limited only by the appended claims.

I claim:

1. A turnbuckle that automatically assumes an axially aligned position with the direction of applied load and in which the cables attached thereto are positioned with their ends aligned with the turnbuckle axis and the direction of the applied load comprising a hollow cylinder having a smooth cylindrical interior surface and a threaded exterior surface, one end of said cylinder being open and the other end thereof being provided with an end wall having an aperture therethrough at the axis of said cylinder; a first cable extending through said aperture, said first cable being provided with an enlarged end portion engaging said end wall within said cylinder to secure said first cable in axial alignment relative to said cylinder, said cylinder having two oppositely disposed elongated axially extending slots formed in the cylinder wall and extending from said end wall to the open end of said cylinder; a slide member reciprocal within said cylinder, said slide member including an elongated hollow cylindrical member having a transverse end surface remote from the open end of said hollow cylinder and having an exterior cylindrical surface slidably engaging the smooth cylindrical interior surface of said hollow cylinder whereby said slide member is coaxial with said hollow cylinder; a pair of radial projections on said slide member, each such projection being integral with and extending outwardly from diametrically opposite portions of said elongated slide member through said slots and beyond the exterior surface of said cylinder, said projections being disposed near the end of said slide member remote from the open end of said hollow cylinder, said slide member having a cavity formed in said transverse end surface coincident with the slide member axis for reception of the enlarged end portion of a second cable; a second cable having an end portion extending through said hollow cylindrical slide member and having an enlarged end portion thereon engaging said axially positioned cavity in the slide member for retaining said second cable in axial alignment with said turnbuckle cylinder; and a nut threadably received on the exterior of said cylinder for engagement with the radial projections on said slide member to axially position the slide member with respect to the cylinder and thereby to control the spacing between the cable end portions and the tension in the connected cables.

2. A turnbuckle that automatically assumes an axially aligned position with the direction of applied load and in which the cables attached thereto are positioned with their ends aligned with the turnbuckle axis and the direction of the applied load comprising a hollow cylinder having a smooth cylindrical interior surface and a threaded exterior surface, one end of said cylinder being open and the opposite end thereof being provided with an end wall having an aperture therethrough at the axis of said cylinder; a first cable received by said aperture, said cable being provided with an enlarged ball end portion engaging said end wall within said cylinder adjacent said aperture for thereby retaining the first cable in axial alignment with the cylinder when tension forces are applied to said cable and the cylinder, said cylinder being provided with a pair of oppositely disposed slots extending axially therethrough substantially from said end wall to the open end of said cylinder; a slide member reciprocably positioned in said cylinder, said slide member including an elongated hollow cylindrical member having transverse end surfaces, one of which is remote and one near to the open end of said hollow cylinder, and having an exterior cylindrical surface slidably engaging the smooth cylindrical interior surface of said hollow cylinder whereby said slide member is coaxial with said hollow cylinder; said cylindrical member having an axial length at least as great as the diameter of said cylindrical member; a first radial projection integral with and extending outwardly from the exterior cylindrical surface of said slide member at the remote end of the slide member and extending beyond the exterior surface of said cylinder, a second radial projection integral with and extending outwardly from the exterior cylindrical surface of the slide member at the remote end of the slide member and extending beyond the exterior surface of said cylinder, said second radial projection being diametrically opposite to said first radial projection, said elongated slide member having an axial bore therethrough of only slightly greater diameter than the cable end to be received therein and said elongated slide member further having a ball receiving socket formed in its remote transverse end surface coaxial with the axes of the slide member and the turnbuckle hollow cylinder; a second cable extending through the axial bore in said slide member, said second cable being provided with an enlarged ball end portion received within the socket in the remote transverse end surface whereby said second cable is retained in adjustable axial alignment with said turnbuckle cylinder and said first cable when tension forces are applied thereto; and a nut member threadably received on the exterior of said cylinder engaging said projections to axially position the slide member with respect to said cylinder and control the spacing between the end portions of said cables and the tension in said cables.

References Cited in the file of this patent

UNITED STATES PATENTS

| 1,649,573 | Clark | Nov. 15, 1927 |
| 2,375,548 | Gilmore | May 8, 1945 |
| 2,452,368 | Gobel | Oct. 26, 1948 |
| 2,703,723 | Hess | Mar. 8, 1955 |

FOREIGN PATENTS

| 116,338 | Sweden | Apr. 30, 1946 |